US006667697B2

United States Patent
Botich

(10) Patent No.: US 6,667,697 B2
(45) Date of Patent: Dec. 23, 2003

(54) MODIFIED KEYS ON A KEYBOARD

(76) Inventor: June E. Botich, 107 Blue Ridge Dr., Naples, FL (US) 34112

( * ) Notice: Subject to any disclaimer, the term of this patent is extended or adjusted under 35 U.S.C. 154(b) by 0 days.

(21) Appl. No.: 10/127,800

(22) Filed: Apr. 23, 2002

(65) Prior Publication Data

US 2003/0197627 A1 Oct. 23, 2003

(51) Int. Cl.$^7$ ................... H03K 17/94; H03M 11/00
(52) U.S. Cl. ................................................ 341/22
(58) Field of Search ............... 341/22, 27; 400/490, 400/493.1, 715

(56) References Cited

U.S. PATENT DOCUMENTS 3,848,723 A * 11/1974 Hogue ............... 400/491.3
4,762,436 A * 8/1988 Herzog et al. .......... 400/490

* cited by examiner

Primary Examiner—Timothy Edwards

(57) ABSTRACT

The invention is directed to an improvement or enhancement of a keyboard. Particularly, the keys of a keyboard are enhanced or modified, to improve or instill a tactile sensation to a person doing the typing. In this respect, certain of the keys are modified by adding tactile edges to the keys, typing school and instructors and instructions for the beginners instruct the learners to place their fingers in the middle row of the lettered keyboard. Instructions further advise to divide this middle row into two groups, one for the left hand and one for the right hand. Both groups involve the four fingers of each group excluding the thumb. The four fingers of the left hand will be placed over the letters A through F and the fingers of the right hand are placed over the letters J, K, L including the semi colon. The outside edges of the key letter A of the left hand and on the semicolon key of the right hand have outside raised edges placed thereon. This way the four fingers of the left hand and the four fingers of the right are sort of cradled between the raised edges and gives the typist a tactile sensation indicating where exactly the fingers are placed on the keyboard which enhances the speed and the accuracy of the person doing the typing.

2 Claims, 5 Drawing Sheets

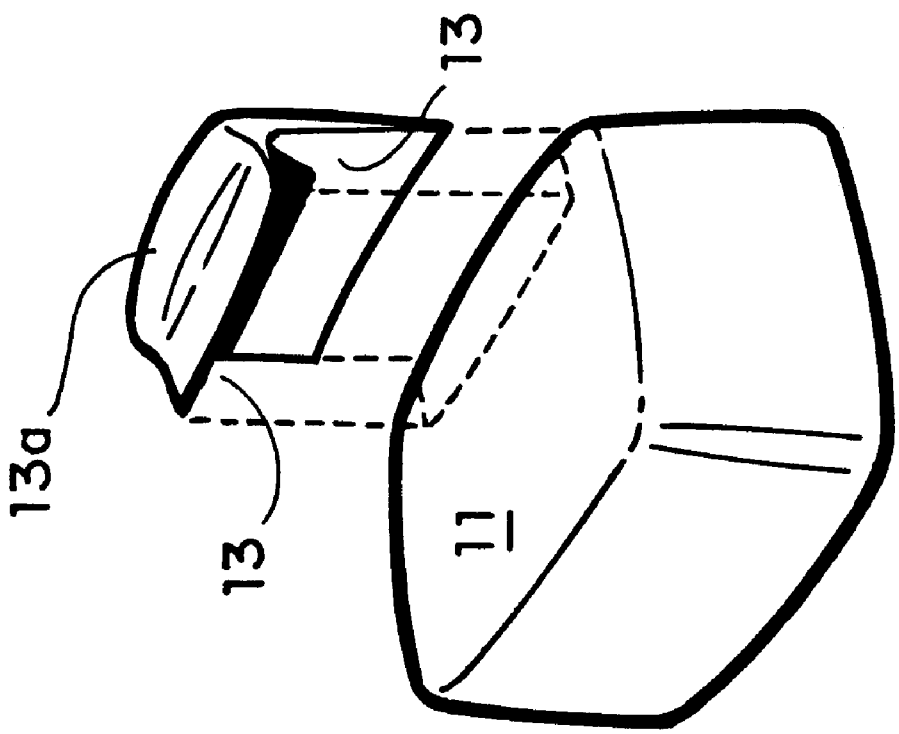
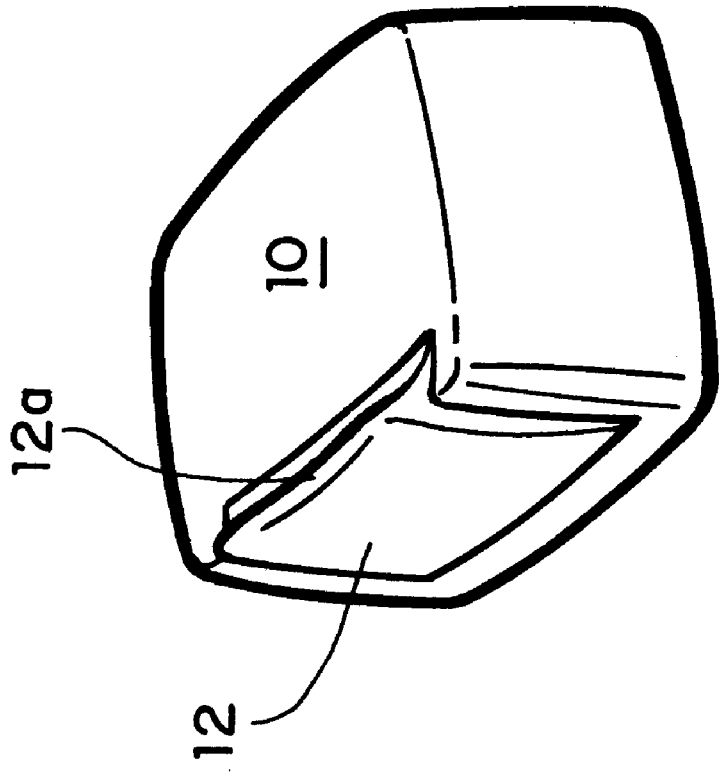
FIG. 4

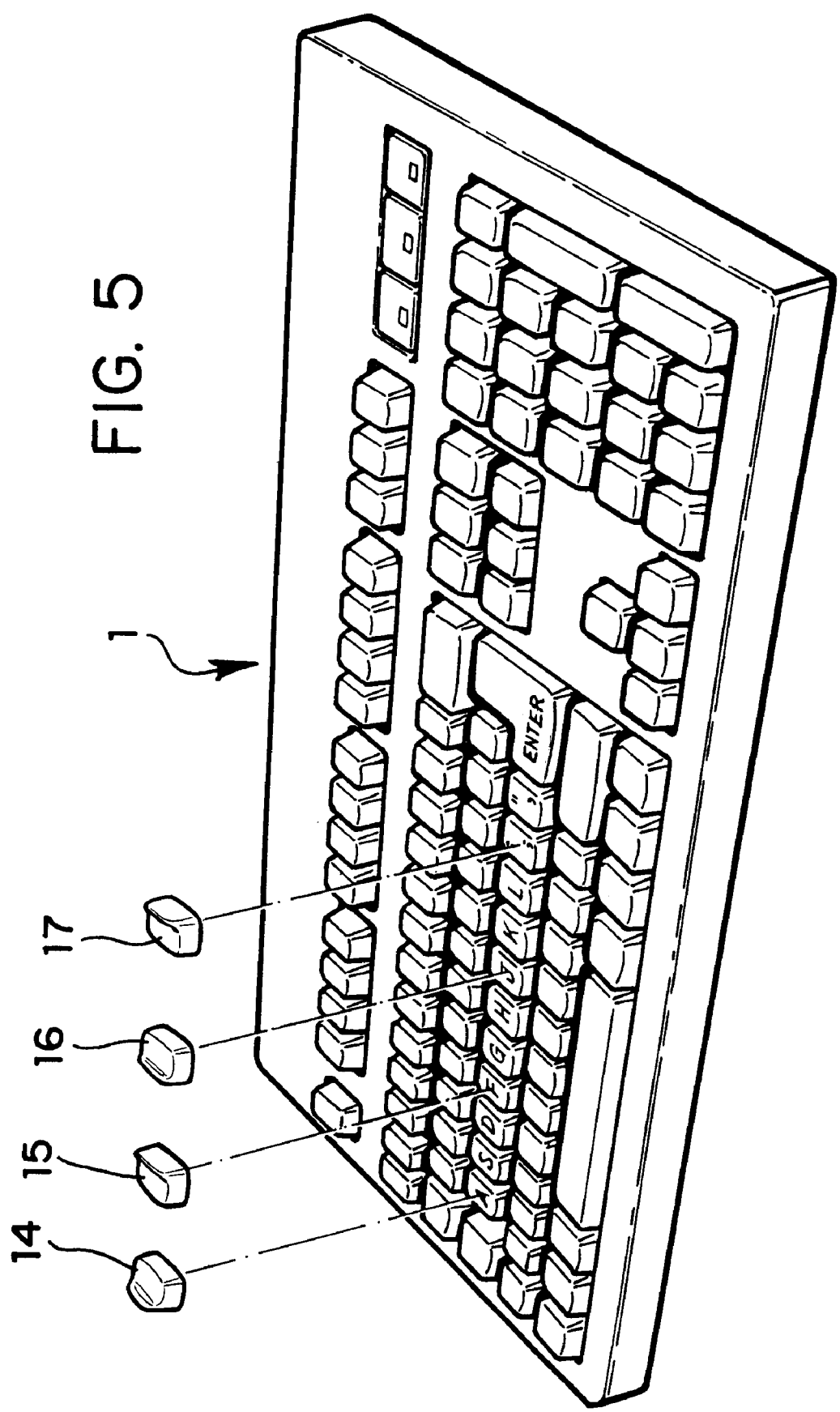

MODIFIED KEYS ON A KEYBOARD

BACKGROUND OF THE INVENTION

The invention is directed to a modification of a keyboard, particularly to the keys of a keyboard. The keyboard can be that of a simple type writer, the keyboard of a word processor or a computer. The purpose of the modifications is for enhancing the speed and accuracy of the person doing the typing.

More particularly, there are certain keys only that will be modified. The keyboard being modified is the internationally well known keyboard under the name or designation of "QWERTY" by taking the first six letters of the upper first row of letters. It is very common for a typist to misplace their fingers while typing, causing typing errors. The inventive concept is directed toward certain keys by improving the tactile contact with the certain keys. Many devices have been developed which will enhance the tactility of a user to be able to quicker find certain keys. For example, such enhancements are found on Braille type writers. Another way of enhancing keys on a keyboard has been developed by the DATACAL ENTERPRISES by color coding certain keys. Other products are known through the catalogs by HOOLEON claiming increased productivity and cut training costs by putting required keystrokes right on the keys there is no need to jump between required cryptic manuals and the requisite keyboard. What is being used here are large print touchdown key top label sets which will enhance any vision problems.

Another enhancement of keys by HOOLEAN is a set of blank keys that may be placed on a keyboard and by pulling the original keys off the keyboard and replacing the same with blank keys. A special key puller is provided to accomplish the above noted task. This set-up may improve the memory of a person typing but does not contribute to a tactical feel when typing.

Another system is known under the name of "Keyguard" which is distributed by "Don Johnston Development Equipment". These keyguards are metal shields with holes over the key position which help prevent the unintentional activation of more than one key at a time. The round holes above each key provide a guide for a finger or pointer and provide the inadvertent pressing of keys.

"Quickeys" by CE Software Inc. present Home-row Indicators that are small adhesive-backed labels that can be attached to home row or any appropriate keys. A raised bump in the center of the indicators serves as a tactile guide for placing the fingers. This teaching is the closest tactile guide known to the applicant.

"Loc-Dots distributed by "ARTS computer products Inc. provides the same principle as 'Quickeys' above in that "Loc-Dots" are adhesive-backed raised dots that can be applied to any keys on any keyboard. They may be used as tactile cues to identify home row keys or other keys as determined by the user.

Then there are "Touchdown Key Expanders" distributed by the "HOOLEAN" Corp. which are caps which fit over the top of keys. These caps present a larger surface for the user to strike. These caps are designed to fit those keys which are large but have a smaller and raised area for the user to strike.

BRIEF SUMMARY OF THE INVENTION

The keys that are modified according to the invention are eight keys located in the middle row of the alphabetical letters. These eight letters are subdivided into two groups of four letters each. These two groups have been chosen because they are used as basic tools or indicators in typing schools or typing instructions. The two letter groups involve the left first group of letters A S D F.

On the right side the second group of letters J K L including the semi colon is being used or designated. The typing instructions always place the left hand four fingers on the first group and the right hand four fingers on the second group of keys. Even professional and proficient typists make typing mistakes because the outside left and right fingers of each hand overreach the positions on the keys where they should be which will cause double strikes, wrong keys or missed lineage. This invention solves the above noted problems by adding tactile means to each of the four outside keys

BRIEF DESCRIPTION OF THE DRAWINGS

FIG. 4 shows how additions can made to certain keys;

FIG. 5 shows full key caps installed over existing keys.

DETAILED DESCRIPTION OF THE INVENTION

Figure 1:
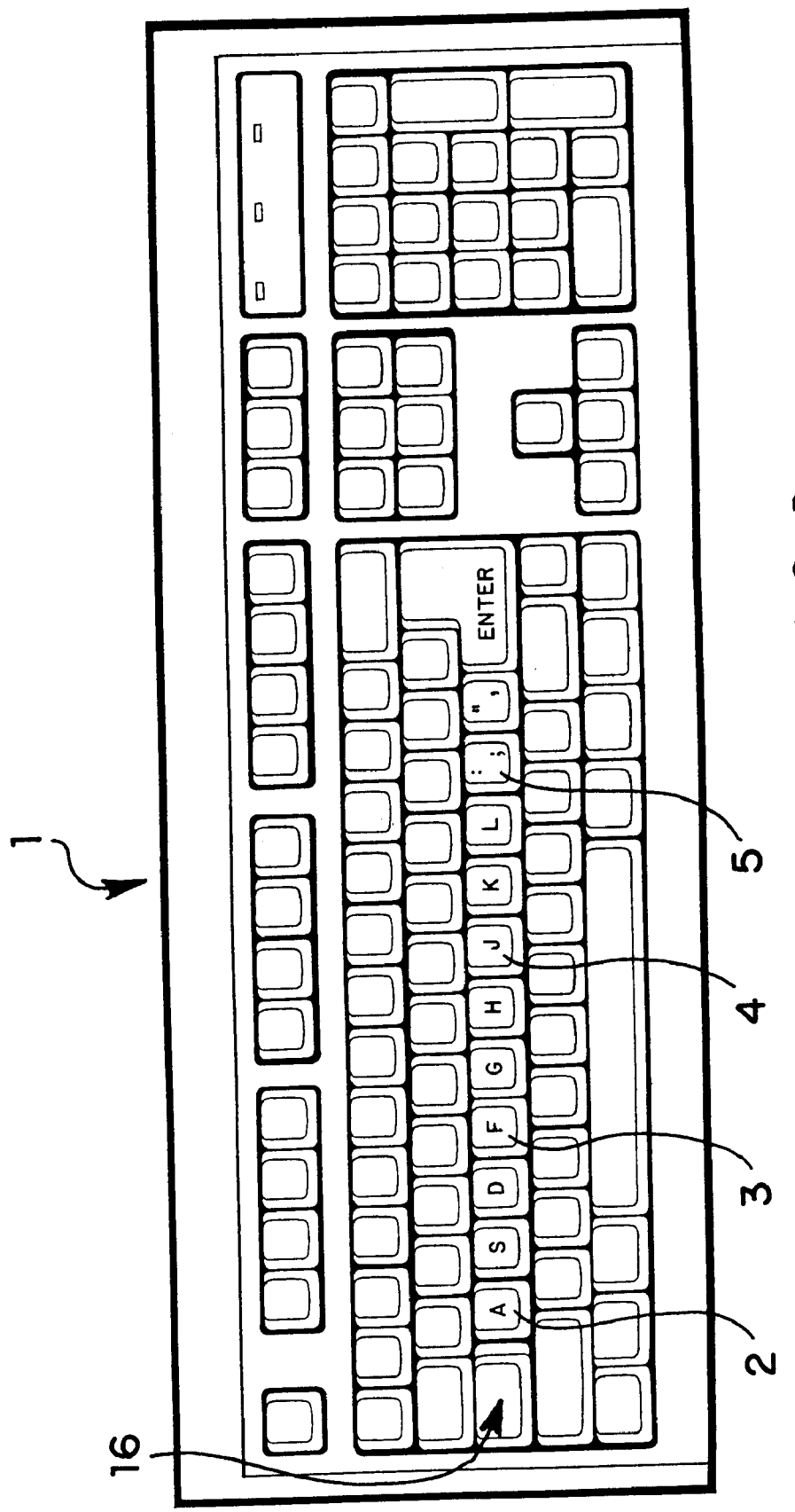
FIG. 1 illustrates a basic keyboard including a grouping of the keys.

FIG. 1 shows the basic layout of a computer keyboard 1 showing the middle row 6 of keys with letters as is well known. According to the invention and what is well known in typing schools or instructions. The placement of fingers on the keyboard in the middle row is subdivided into left and right finger placement sections. The left hand section includes the letters (A S D and F). The right hand section includes the letters (J K L and the semi colon). The left hand fingers of the typist including four fingers but excluding the thumb are placed on the above noted keys. The right hand fingers of the typist including four fingers but excluding the thumb are placed on the above noted keys. These are the teachings in typist instructions. In order to enhance the typist's performance, the outside keys have been improved by adding tactile edges to the keys, that is, the left edge of key A and the right edge of key F in the first section on the middle row of the keyboard and the left edge of key J and the right edge of the key with the semi colon. In this manner, a sort of cradle is formed for each of the left and the right section, respectively, of the middle row of the lettered keyboard. It can now be understood that the typist will always feel how to place both the left and the right hand on the respective four keys because of the tactile feel by the raised edges of the respective keys will be the guidance. This fact does greatly improve the speed and accuracy of the typing being performed. There are various ways of adding the tactile feature to any of the keys.

Figure 2:
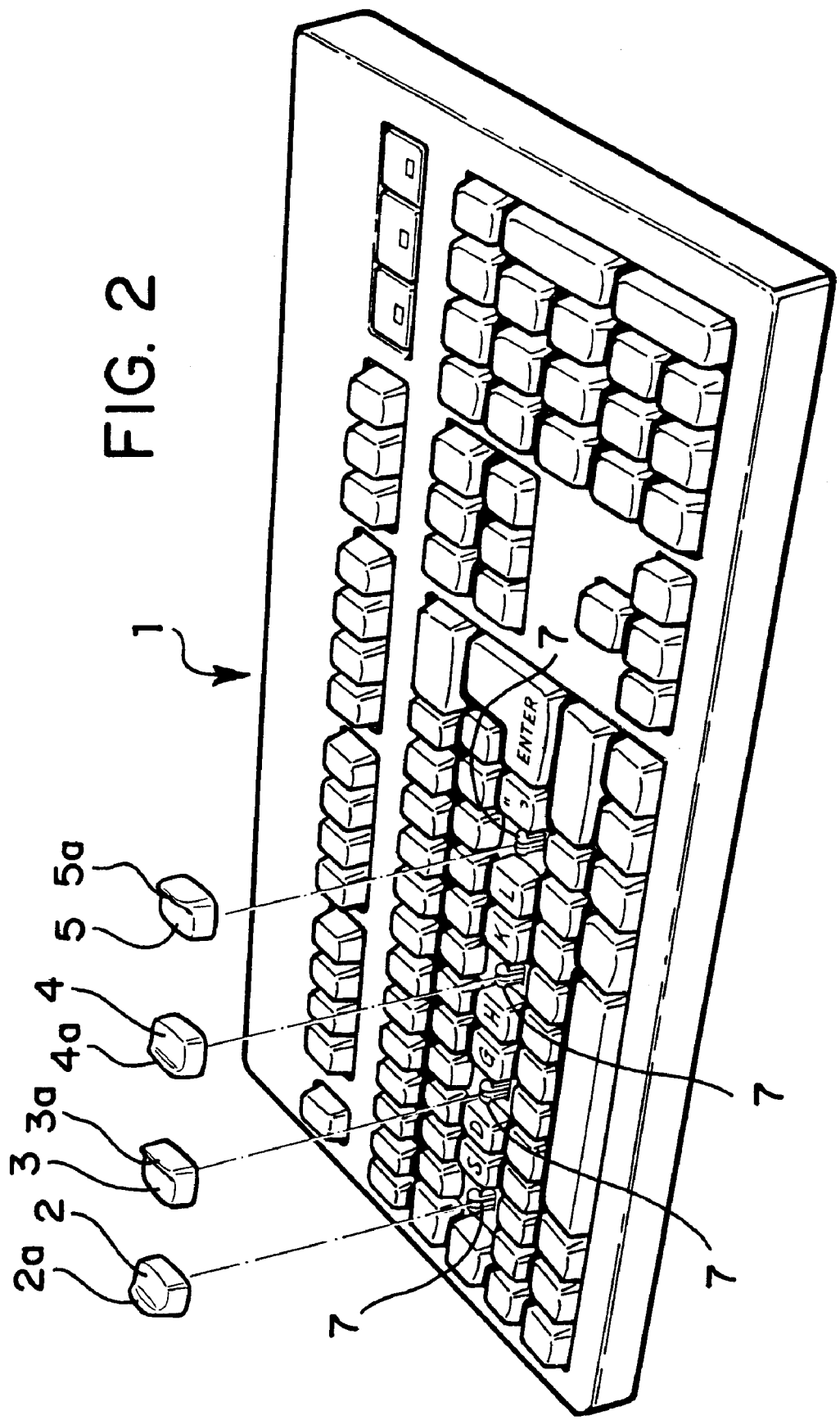
FIG. 2 shows how to replace certain keys on the keyboard shown in FIG. 1.

In FIG. 2, complete keys can be removed from the keyboard by using key pullers well known in this art. When a key is removed from the keyboard single studs or clamps remain as shown at 7. The replaceable keys 2–5 have the same interior aperture as the keys taken off and therefore, will be easily replaced over the existing studs 7 in a permanent manner. The raised edges on the replaced keys are shown at 2a–5a.

Figure 3:
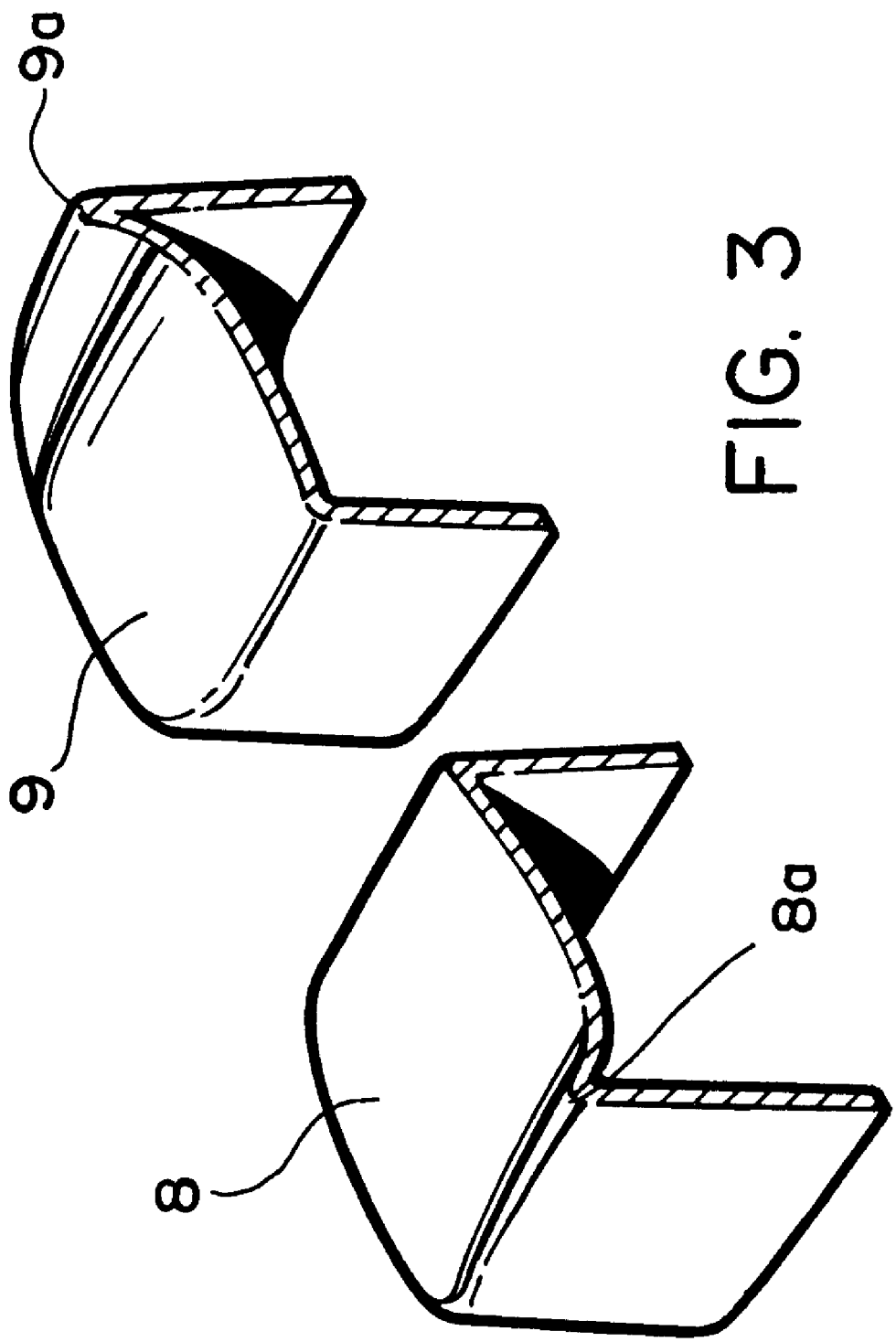
FIG. 3 illustrates how caps can be added to certain keys.

FIG. 3 shows a different way of modifying the keyboards 1 of (FIGS. 1 and 2). Instead of pulling the keys off the keyboard as was explained in FIG. 2, the existing keys can be covered with a key shell or cap 8 and 9. The shells are made out of a clear plastic so that the existing letters or marks on the top surface of the keys can clearly be seen. The shells 8 an 9 are cast in one piece so that they will have a snug fit when pushed over the existing key. At this time it should be noted that it is preferred that the outside keys A and the semi colon should have the raised edge somewhat higher than the inside keys. In FIG. 3, note the higher edge 9a when compared to the edge 8a. The reason for this arrangement is to further enhance the tactile sensation when both hands are on the keyboard whereby there is no doubt that the hands are placed correctly and will remain there when typing commences.

Turning now to FIG. 4 which illustrates still another way of modifying the keys on a keyboard. To this end, individual pieces 12 and 13 have been designed so that they can be adhesively attached to existing keys. The individual piece 12 is adhesively installed while the piece 13 is shown how it should fit on the key 11 including a depending wall which will adhesively be fastened to a side wall of a key. Again the raised edges 12a and 13a should be chosen as a high and a low edge as explained with reference to FIG. 3. It was contemplated to mainly install just a raised edge on the top surface of the key without a depending wall. However such an installation would lead to inaccuracies by the installer which would surely defeat the purpose of accurately installing the raised edges in the first place.

FIG. 5 shows an exploded view of a modified keyboard wherein the caps 14–17 are ready to be installed over existing keys indicated by A, F, J and the semicolon. Again the plastic caps should be made of clear plastic so that underlying letters can shine through the caps with no further modifications having to be made. The above modifications can easily be made at a low cost at the point of sale. However, the key modifications could readily be made or installed when new keyboards are made ready for sale.

What I claim is:

1. A modified keyboard comprising tactile additions adapted to be placed on a top surface of any chosen key of said keyboard, said tactile additions are placed on only one edge of any of said keys, wherein each of said tactile additions is molded onto a complete new key, said complete new key serves as a replacement of an existing key; wherein said keys having said tactile additions thereon are placed in a certain predetermined row on said keyboard, said row is a middle row of lettered keys, wherein said tactile addition is placed on the left edge of the 'A' key and the right edge of the 'F' key in a first section of said middle row and on the left edge of the 'J' key and the right edge of the ';' (semi colon) key in a second section of said middle row.

2. A modified keyboard comprising tactile additions adapted to be placed on a top surface of any chosen key of said keyboard, said tactile additions placed on only one edge of any of said keys, wherein each of said tactile additions is adhesively fastened to a surface of and said edge of key, wherein said keys having said tactile additions thereon are placed in certain predetermined groups on said keyboard, wherein said groups are placed in a row on said keyboard, said row is a middle row of lettered keys, wherein there is a left group and a right group, the left group involving the letters A–F and the right group involving the letter J through the semicolon and wherein the tactile addition on said key being on the outside of the of the left group and the addition on the key being on the outside of the right group have a greater height than said additions on the inside of each of said groups.

* * * * *